March 10, 1925. 1,528,968
W. A. BROWN
APPARATUS FOR TREATING PETROLEUM
Original Filed June 16, 1920 3 Sheets—Sheet 1
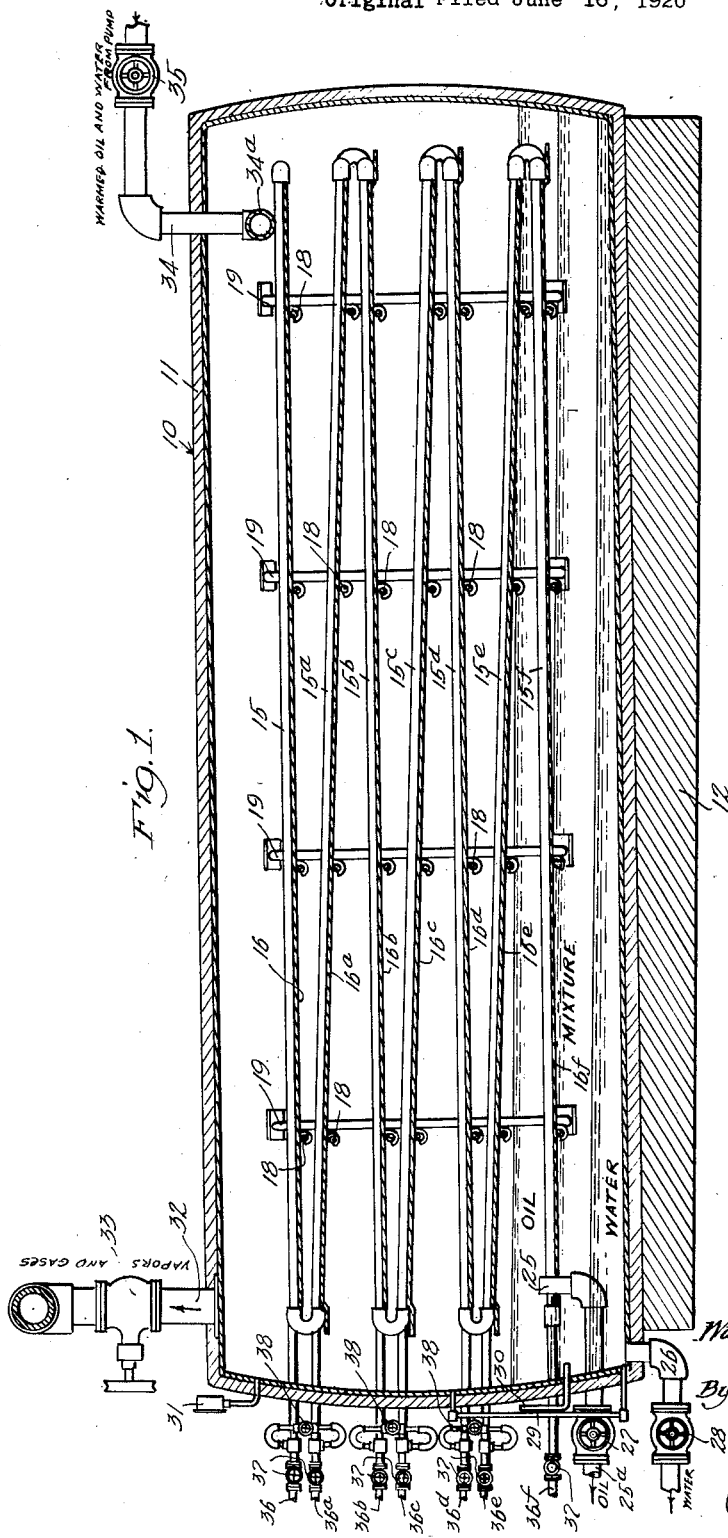

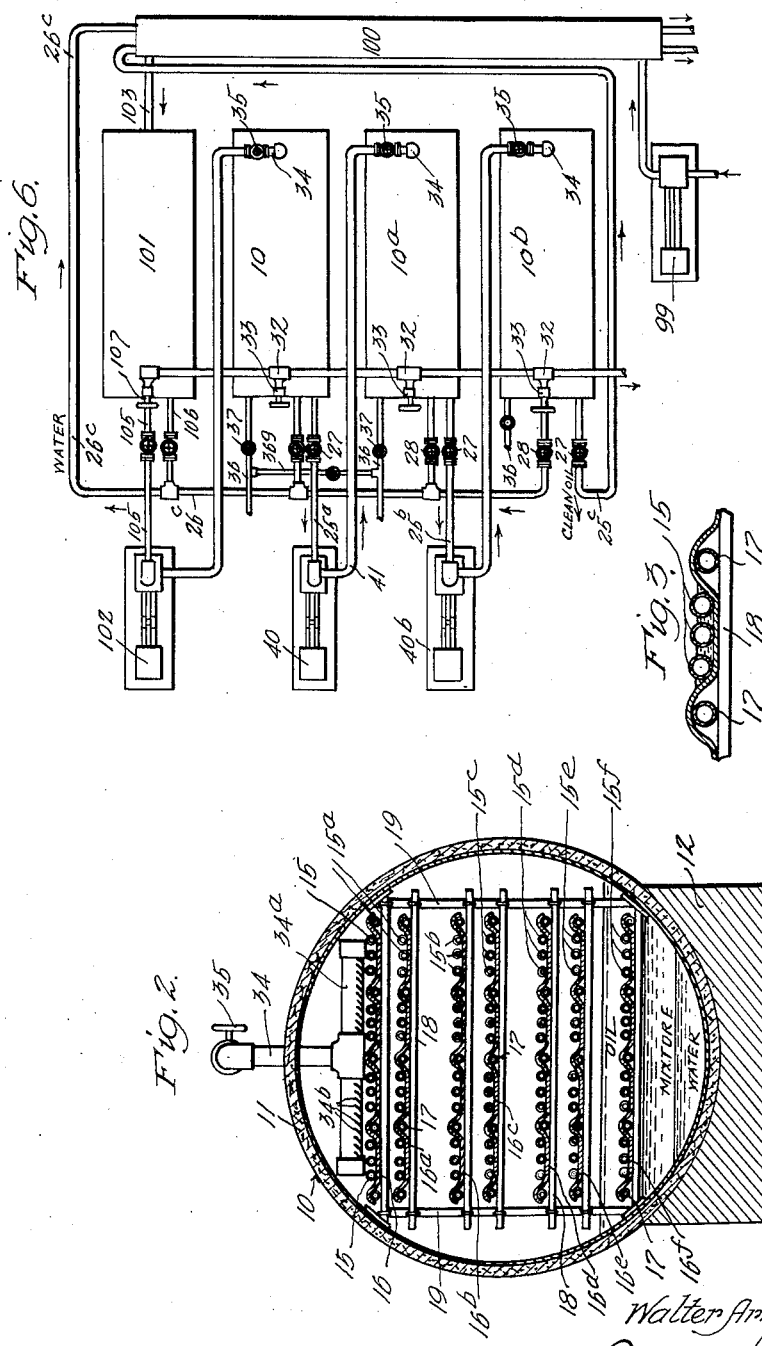

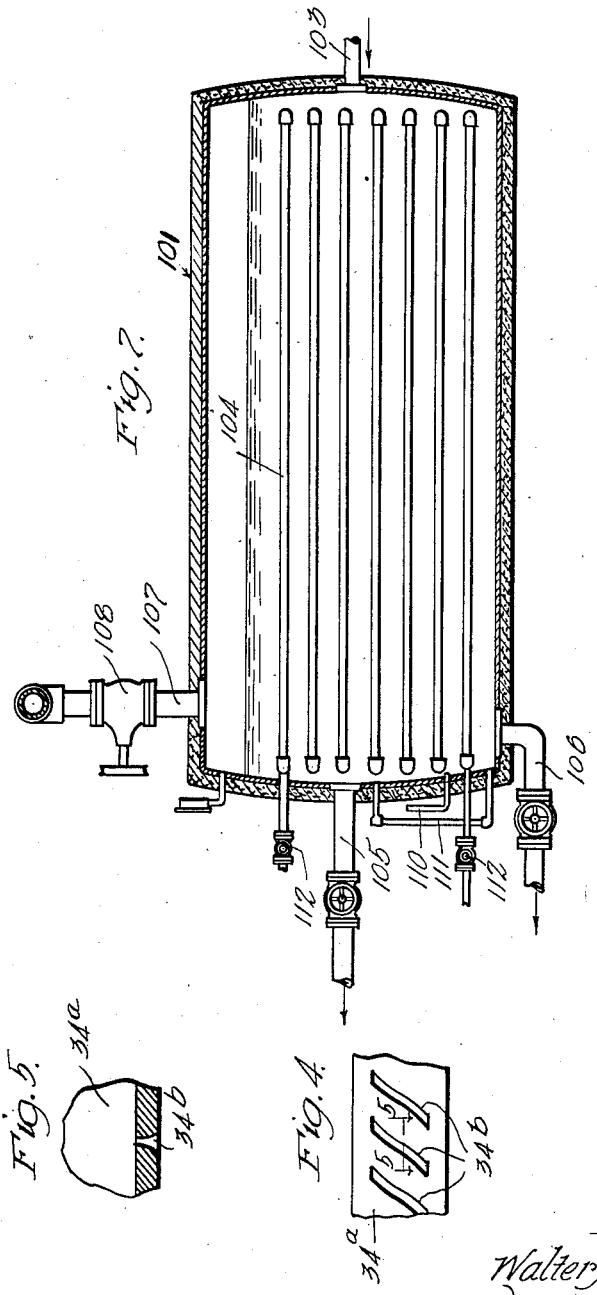

Patented Mar. 10, 1925.

1,528,968

UNITED STATES PATENT OFFICE.

WALTER A. BROWN, OF LOS ANGELES, CALIFORNIA.

APPARATUS FOR TREATING PETROLEUM.

Original application filed June 16, 1920, Serial No. 389,321. Divided and this application filed June 28, 1921. Serial No. 481,124.

*To all whom it may concern:*

Be it known that I, WALTER ARTHUR BROWN, a citizen of the United States, residing at Los Angeles, in the county of Los Angeles, State of California, have invented new and useful Improvements in Apparatus for Treating Petroleum, of which the following is a specification.

This invention relates to apparatus for treating hydrocarbons according to the process set forth in my application, Serial Number 389,321, filed June 16th, 1920, Process of treating petroleums, of which this present application is a division. The process relates most particularly to treatment of petroleum and water emulsions for the separating of the two liquids; and this apparatus, although not necessarily limited to treatment of such emulsions, is particularly effective for that purpose. In order to make the apparatus and its use clear I shall here describe specific forms of the apparatus and the process carried on therein.

In my United States Letters Patent No. 1,309,794 issued July 15th, 1919, entitled Process of separating hydrocarbons from water, I have set out a method of procedure which involves the heating of such mixtures to a certain temperature, and simultaneously holding on the mixture sufficient pressure, to prevent or repress the vaporization of water. Preferably the temperature is around the normal boiling point of water and the pressure is preferably just sufficient to repress water vaporization at such temperature. These are not necessary conditions but I find them effective and efficient. After subjection to such conditions for a short time period, the water may then be settled out of the mixture by gravity. I have also found, and it has been my practice in the practical operation of the process on large quantities of such emulsions (and this is also set forth and claimed in said Letters Patent), that the settling of the water may be accelerated and facilitated by relatively increasing the pressure with relation to the temperature, after the emulsion has been subjected to the aforesaid conditions of temperature and pressure, more or less accurately in "equilibrium", as I may express it. This relative increase of pressure I have found may be effected either by actually increasing the pressure or by decreasing the temperature, or both; and this relative increase of pressure results in a quiescence of the liquid which facilitates and accelerates settling out of the water.

The process herein explained has certain features in common with my process for treating petroleum set out in my co-pending application filed June 16th, 1920, Serial Number 389,320; and this present apparatus application has certain broad resemblances to the divisional apparatus application on the above mentioned process which application for apparatus for treating petroleum is filed on even date herewith, Serial Number 481,123.

The process as carried out in the apparatus herein explained, attains generally and broadly the same operative conditions as explained in my prior Letters Patent and in said co-pending application, Serial Number 389,320, but it attains those operative conditions in a manner quite distinctly different from the others. In the present process the mixture is heated and given its emulsion breaking treatment in a comparatively small body, preferably in a thin stream; and in this thin stream I find that it is possible, and is in some cases desirable, to heat the mixture to a point considerably above the temperature at which it is subsequently held for separation and settlement of the water, and considerably above the water vapor temperature that corresponds to the pressure being held upon the vapors and gases. The application of heat to the liquids in a comparatively small body (in a comparatively thin stream) and to only a comparatively small mass of the liquid at any one time, renders possible this method of application of the heat. After being subjected to this heat application, the treated liquids then continuously move into a continuously maintained larger body of the liquids, where separation takes place: this larger body of liquid being maintained at a temperature substantially preferably around the normal boiling point of water and a corresponding pressure being held on the liquids to prevent or repress free vaporization of the water therein. Quiescence of the liquid during the settling operation is thus maintained, by repressing the water evaporation and by maintaining a comparatively large volume of liquid which is not violently disturbed by the constant inflow of the comparatively small stream of liquid which has been subjected to the emulsion breaking treatment. Under these circumstances it will readily be seen that the temperature to which the thin stream of liquid is subjected, prior to passing into the large body, is not so directly connected with, or dependent upon, the temperature at which the large body is maintained, as it is in the process described in my said prior patent; or so closely as it is in the process described in my said co-pending application.

With these general ideas of the present process and apparatus in mind, the invention, both in its broad scope and in its preferred specific aspect and details, and the objects of the invention and the corresponding accomplishments, will be best understood from a detailed description of a specific and preferred form of apparatus and process. Accordingly, for this purpose, I now refer to the accompanying drawings in which:

Fig. 1 is a vertical longitudinal section of an apparatus element in which my process may be carried out; Fig. 2 is a transverse vertical section of the same; Fig. 3 is an enlarged detail section of parts shown in Fig. 2; Fig. 4 is a detail plan of the distributing pipe through which the liquids are fed into the treating tank; Fig. 5 is a detail section taken as indicated by line 5—5 on Fig. 4; Fig. 6 is a diagrammatic plan showing how a plurality of the treating elements shown in Figs. 1 and 2 may be used in connection with each other, and the liquids put through them in series; and Fig. 7 is a section showing a form of pre-heater that may be used in the system shown in Fig. 6.

In the drawings I illustrate a suitable tank 10 which preferably in this case is made of metal, cylindrical in form, and laid substantially horizontally and somewhat inclined toward one end. For purposes of ease of description I shall refer to the lower end (to the left in Fig. 1) as being the forward end of the tank. In a tank of say, 50 ft. length and 10 ft. diameter, the difference in levels between the two ends may be about six inches. The tank is preferably surrounded by heat insulating jacket 11 and may be set on any suitable foundation 12. Its construction, its relative dimensions, its capacity, etc. are more or less immaterial features; I simply give the foregoing dimensions as typical of a practical installation. Within the tank I place a series of heating coils 15, 15$^a$, 15$^b$, 15$^c$, 15$^d$, 15$^e$ and 15$^f$; each coil being composed of a series of longitudinal parallel pipes. Beneath each of these coils there is a metal pan 16, 16$^a$, 16$^b$, 16$^c$, 16$^d$, 16$^e$ and 16$^f$. These pans, and the coils, are supported on longitudinal supporting rods or pipes 17, which in turn are supported upon cross rods or pipes 18; and the members 18 are supported upon suitable vertical posts 19, set in the tank. The pipes of the various coils are arranged in groups of two or more, as is illustrated in the drawings; and the pans are corrugated, as illustrated best in Fig. 2, so as to have longitudinally extending depressions immediately beneath each group of pipes, and longitudinal rib portions extending over the supporting pipes 17. By this construction the liquids flowing longitudinally of the pans are kept concentrated around and near the pipes 15. Pipes 15 may rest directly upon the pan; or they may be raised slightly above the pan so that a thin stream of oil may flow on the pan below the pipes. In any case, however, the relatively thin stream of oil flowing on the pan, is either in direct contact with the pipes of the heater coils or is very close to the pipes, so that the liquids may be quickly heated to their proper temperature and may be intimately heated throughout their whole mass. Fig. 3 shows the pipes 15 resting on the pan and shows a thin stream of oil on the pan in contact with the pipes.

Each coil and its pan is supported so as to slope from end to end, successive coils and pans sloping in opposite directions. For instance, the uppermost coil 15 and its pan 16 slope downwardly toward the front end of the tanks. I find that a difference in level of about six inches between the two ends of these pans is sufficient to give the required flow. The oil passing off of the front end of the uppermost pan drops onto the front end of the next pan 16$^a$ and then runs to its rear end where it drops off onto the next pan 16$^a$ and runs again to the front end. Thus the oils runs back and forth on the several pans, in direct contact with, or close to, the heating coils and then drops into the body of liquids maintained in the lower part of the tank. I illustrate this body of liquids as being maintained above the level of the lowermost coil 15$^f$ and pan 16$^f$; and in practice this is about where the liquid level is usually maintained. If the liquid level were always maintained at this point it would not be necessary to have a pan 15$^f$ for the coil 16$^f$; but the amount of liquid in a bottom of a tank may be varied, and if it is run down to any great extent, then the pan 16$^f$ becomes operative. In an actual installation the bottom coil and its pan are about twenty-four inches above the tank bottom, in a tank of the size given; but the liquids are maintained at about the comparative level illustrated; preferably just covering the lowermost coil; so that the heat from the lowermost coil will only directly heat the upper parts of the liquid, which upper parts are usually clean oil. The clean oil outlet is at 25 at the forward end of the tank; the water outlet is at 26 at the lowermost point in the tank. These outlets are controlled by valves 27 and 28 respectively. A gauge glass may be provided at 29 to observe the liquid levels and a thermometer is provided at 30 for observation of the temperature. A pressure gauge may be provided at 31. The vapor and gas outlet is at 32 from the upper part of the tank, controlled by a valve 33. The inlet of mixed oil and water is through a pipe 34 controlled by a valve 35; the liquids being fed by any suitable pressure, as from a pump 102 (Fig. 6.) The regulation of the pump controls the rate of introduction to the tank 10. The pipe 34 passes down through the top of the tank and there connects with a transverse pipe $34^a$ provided with distribution slots $34^b$ in its lower side to distribute the oil transversely over the upper end of the uppermost pan 16. These slots are preferably cut diagonally across the lower face of the pipes and are formed so as to be wider on their exterior faces and narrower at the interior surface of the pipe, so as to prevent clogging of the slots.

I provide a means for completely controlling the temperature of the various heating coils by providing means so that steam may be sent into individual coils independently of each other. Thus there may be a steam pipe 36 leading to the uppermost coil; then there may be a steam pipe $36^a$ leading to the coil $15^a$; a steam pipe $36^b$ leading to coil $15^b$ and likewise pipes $36^c$, $36^d$, $36^e$ and $36^f$ leading to coils $15^c$, $15^d$, $15^e$, and $15^f$ respectively. By means of these various pipes live steam at any suitable temperature and pressure may be put into the various coils; and the admission and exhaust of steam from the coils may be controlled by the valves 37 on the various pipes. In ordinary practice steam may be put through all of the coils in series; and for this purpose I provide valve controlled by-passes at 38; so that steam which is introduced into the lowermost coil at the pipe $36^f$ may be passed in series through all of the coils and may pass out through the uppermost pipe 36; the amount of steam expansion and its fall in temperature being controlled by the valves 37 on the pipes. In practice I usually open the inlet valve or valves wide to admit steam at the pressure supplied from the boiler, and control the flow by manipulation of the outlet valve or valves. Where only one treating element is used steam may be put in series through all the heating coils; or live steam may be supplied independently to as many of the coils, individually, as may be necessary or desirable. However, in a plant consisting of two or more tanks 10 I may pass live steam through one or more of the tanks and then the exhaust steam from these tanks may pass through one or more of the other tanks. For instance, in such a plant as indicated in Fig. 6, comprising three tanks 10, $10^a$ and $10^b$, the oil and water mixture is put through the tank 10 first and then, passing out from that tank through the outlet pipe $25^a$, is pumped by a pump 40 through pipes 41 to the inlet pipes 34 of tank $10^a$; and then after passing through that tank it passes out through pipe $25^b$ and is pumped by the pump $40^b$ through the pipe $41^b$ to the inlet pipe 34 of the tank $10^b$; whence the clean oil finally passes off through the discharge pipe $25^c$. The rate of flow, and the amount of mixture in each tank is controlled by regulation of the pump. In this arrangement I find it advantageous for instance, to supply all the coils of the tanks $10^a$ and $10^b$ with live steam at about ninety or ninety-five pounds pressure per square inch; and then to supply the lower coils of tank 10 with live steam and supply the upper coils in tank 10 with exhaust steam from the coils of tank $10^a$. This may be done through a cross connection as indicated at $36^g$ in Fig. 6. By this procedure the liquids in the first tank 10 are not maintained at quite so high a temperature as in the other tanks $10^a$ and $10^b$; and in practice when, for instance, the accumulation of liquid in tank 10 is maintained at say 215° F. the accumulation of liquid in tanks $10^a$ and $10^b$ may be maintained at about 218° or 220° F., that in $10^b$ being a little hotter than in $10^a$. This utilization of the exhaust steam from one or more of the treators in one or more of the other treaters, is largely for the purpose of efficient use of heat, the oil thus running from a cooler to a hotter coil, and for the same purposes, the steam that runs in series through two or more tanks is put first through that tank through which the liquids last run; and in any one tank the steam is put into the lower coil and runs out at the upper coil. Where the tanks are thus run in series, increasing in temperature, corresponding increases in pressures are made. For instance, at temperature of 215°, 218°, and 220°F., the pressures may be respectively one, two and three pounds per square inch, approximately to balance the water vapor pressure; or each somewhat less if it is desired to "foam" the liquids somewhat; or each somewhat greater if it is desired to further repress vaporization. By this method of operation there is a progressive increase in temperature accompanied by a progressive increase in pressure—a feature in common with the process of my said co-pending application.

Before going to the first heater tank 10 the cool mixture may be forced by pump 99 through a heat exchanger 100 through which the hot water and hot clean oil are passed by pipes $26^c$ and $25^c$. By this exchanger of heat the mixture may be warmed to as much as 160° F. to 175° F. or more. The warm mixture may then pass through pipe 103 to a preheating tank 101; which may be simply a tank with steam coils 104, oil and mixture outlet at 105 leading to pump 102, water outlet at 106, vapor outlet 107 controlled by valve 108, thermometer 110, and gauge glass 111. The steam for coils 104 may be regulated by its valves 112 to bring the liquids up approximately or near to the temperature at which the treating is to take place. The temperature to which the liquids are heated is sufficient to cause some breaking up of the emulsion and settlement of water, and for this purpose a proper pressure may be maintained in tank 101 by regulation of valve, 108. The water from this tank, like that from all the other tanks, may be run to water pipe 26°. The emulsion breaking treatment in this pre-heater is similar to the general method described in my said co-pending application.

The system including the heat transfer, etc. is the subject matter of another application about to be filed by me. Accordingly, no claims are herein made to the system as a whole.

I have found that a certain proportion of the water can in most cases be separated off before the liquids have been treated to the maximum treating temperature; and it is therefore advantageous to treat the liquids in several tanks in series. The water is then drawn off several times as it settles out of the liquid partially in each tank. The removal of the water obviates the necessity of further heating of the water, thus further increasing the economy of operation. Of course, it will be understood that a complete treatment and complete separation of the water can be had in one tank, the temperature, pressure, and time period being regulated properly for that purpose; and that, in a plant of more than one tank, the liquids may be put through them in parallel. But the series arrangement lends itself well to economy in heating, both in use of steam and in successive partial withdrawals of water. Furthermore, economy of apparatus may also be effected; because, for instance where a large volume of water is taken out in the first one or two tanks, a single third tank may be able to handle the remaining liquid from more than one set of the two prior tanks.

Where live steam is used in the upper coils and is used at the pressure herein before stated, its temperature is a little more than 330° F.; but the temperature to which the oil is heated does not necessarily depend directly upon the original temperature of the steam; because it also depends upon the amount of steam sent through the coils; the amount of expansion allowed that steam and the amount of drop in temperature, and also upon the volume of oil heated by a given volume of steam. However, the whole stream of oil is intended to be heated to a temperature higher than that at which the body of liquid is maintained at the bottom of the tank; and of course it may be that parts of the stream of oil are heated to a considerably higher temperature. However, the constantly flowing stream of oil is heated to a temperature sufficiently higher than the temperature at which the body of liquid is maintained at the bottom of the tank, so that when the liquid reaches the bottom of the tank where it is not so much directly heated by the heating coils, it will not, by the natural processes of conduction of radiation from the tank, fall below the desired temperature. That desired temperature may be anywhere around the normal boiling point of water or it may be substantially higher. If, for instance, it is desired to operate with the body of liquid substantially at normal boiling temperature, say at a temperature of 218° F.; then a pressure of about two pounds per square inch above atmosphere is held upon the gases and vapors, by proper regulation of the valve 33. This pressure may be varied somewhat. In some instances it is best to prevent water vaporization practically completely, while in other instances it is best to allow a restricted amount of water vaporization so as to allow the liquid to slightly foam.

It will now be understood how, in this process, the constantly heated stream of liquid flows into a comparatively large body of liquid maintained in the bottom of the tank. In a tank of the size herein indicated, the liquid is run through at a rate up to 5,000 or more barrels per day (24 hours). This heated constantly running stream of liquid, having been subjected to the heat and pressure operation, has had its emulsion either wholly broken up or partially broken up. The comparatively large body of liquid in the bottom of the tanks is comparatively quiet. The free water immediately settles out under gravitation and the free oil immediately rises to the top; the water and oil being drawn off to maintain the proper level of liquid in the bottom of the tank. Between the water at the bottom and the oil at the top there lies a layer of mixture of oil and water, out of which the water is settling and the oil is rising. A single tank may be so manipulated, and the oil may be run through it slowly enough, that the emulsion will be completely broken up in a single operation; and if this is the case, of course, nothing but clean oil and water will be drawn off from the tank, but if the tanks are run in a series, then free oil and a mixture of oil and water together will be drawn off through the oil outlet and transferred to the next tank. Now, it will readily be seen that the pressure on the mixture out of which the water is settling and from which the oil is rising will depend upon two things, first upon the gas and vapor pressure maintained in the tanks, second upon the hydrostatic pressure of liquid over the layer of mixture. Thus the pressure upon the mixture may be maintained somewhat greater than the pressure on the liquids which are flowing downwardly over the pan (which pressure is only the gas and vapor pressure) and the additional pressure upon the layer of mixture in the lower part of the tank may be somewhat varied by varying the depth of the oil layer above the layer of mixture. For instance, if the water is kept pretty well drained out and the oil level is kept fairly high, then there will be an appreciable increase in pressure upon the mixture layer; and this appreciable increase in pressure may be utilized to facilitate and accelerate the settling out of the water.

By keeping the upper layer of oil in contact with coil 15$^f$ and keeping the mixture layer below the coil, the oil layer may be directly heated without further heating the mixture layer and without agitating the mixture by generation of vapors in it. In other words the oil layer may be heated to a temperature above that at which the body of liquid is held (above 210° F. for instance) without causing further heating and generation of water vapor in the mixture layer, and in the water layer below, at the pressure being then held on the liquids. This further heating of the oil layer will take place to a certain extent by reason of its lying around coils 15$^f$ long enough to take a high temperature from them even when they are heated with the same steam that afterwards passes through the upper coils. But, if desired, the lower coil 15$^f$ may be independently heated with steam of a higher temperature. The result of any such additional heating of the oil layer is the generation of further vapors from the oil, in addition to the vapors generated during passage of the liquids over the pans. The process is thus not only one for separation of the oil and water but also for topping the oil.

Furthermore, topping of the oil can be effected as far as desired by heating the oil to a suitably high temperature as it flows over the pans. That temperature is always somewhat higher than the temperature of the body below; but it can be considerably above the body temperature, and then the effect is to considerably top the oils before they enter the body, and (like method explained in the preceding paragraph) is to top them without interfering with the quiescence of the body in which separation and settlement is taking place.

Having described a preferred form of my invention, I claim:—

1. Apparatus for treating oils, embodying a closed tank with inlet and outlet, a supporting frame in the tank, a series of sloping pans supported on the frame, the pans extending longitudinally through the tank arranged one above the other and sloping one in one direction and the next one below in the opposite direction and their ends being arranged so that liquid will drop off the low end of one onto the high end of the next lower one, so that liquid fed onto the uppermost pan will run back and forth on the several pans; and steam heating coils directly over each pan, said coils embodying longitudinally extending pipes, and the pans being longitudinally troughed to concentrate the liquid beneath the pipes.

2. Apparatus for treating oils, embodying a closed tank with inlet and outlet, a supporting frame in the tank, a series of sloping pans supported on the frame, the pans extending longitudinally through the tank arranged one above the other and sloping one in one direction and the next one below in the opposite direction and their ends being arranged so that liquid will drop off the low end of one onto the high end of the next lower one, so that liquid fed onto the uppermost pan will run back and forth on the several pans; and steam heating coils directly over each pan, said coils embodying spaced groups of longitudinally extending pipes, the plane of each group being parallel to the pan, and the pans having flat bottomed longitudinal troughs to concentrate the liquid in flat thin streams beneath the pipes.

3. Apparatus for treating oils, embodying a closed tank with inlet and outlet, a supporting frame in the tank, a series of sloping pans supported on the frame, the pans extending longitudinally through the tank arranged one above the other and sloping one in one direction and the next one below in the opposite direction and their ends being arranged so that liquid will drop off the low end of one onto the high end of the next lower one, so that liquid fed onto the uppermost pan will run back and forth on the several pans; steam heating coils directly over each pan, a heating coil near but spaced from the bottom of the tank, means to maintain a body of liquid in the bottom of the tank at a level above the lower heating coil so that such heating coil will heat the upper part of said liquid body, and means to independently control feed of heating medium to said coils thereby to control independently their effective temperatures.

In witness that I claim the foregoing I have hereunto subscribed my name this 18th day of June, 1921.

WALTER A. BROWN.

Witness:
VIRGINIA I. BERINGER.